United States Patent [19]

Horton, Jr.

[11] Patent Number: 4,620,957

[45] Date of Patent: Nov. 4, 1986

[54] PROCESS FOR MANUFACTURING OPTICALLY CLEAR TWO-COLORED OBJECTS

[76] Inventor: Frederick L. Horton, Jr., 4510 Elkin Ave., Nashville, Tenn. 37209

[21] Appl. No.: 764,510

[22] Filed: Aug. 9, 1985

Related U.S. Application Data

[63] Continuation of Ser. No. 526,601, Aug. 26, 1983, abandoned.

[51] Int. Cl.$^4$ .................. B29C 45/14; B29C 45/16
[52] U.S. Cl. .................. 264/247; 264/1.7; 264/261; 264/263; 264/275
[58] Field of Search .......... 264/1.7, 245, 246, 247, 264/254, 275, 331.18, 331.21, 261, 263; 2/10, 12; 351/45, 47

[56] References Cited

U.S. PATENT DOCUMENTS

| | | | |
|---|---|---|---|
| 1,182,398 | 5/1916 | Malcom | 2/12 |
| 1,963,716 | 6/1934 | Ritchey | 2/12 |
| 2,020,684 | 11/1935 | Haviland | 264/246 X |
| 2,068,849 | 1/1937 | Dewitt | 2/12 |
| 2,138,086 | 11/1938 | Blodjer | 2/10 |
| 2,445,153 | 7/1948 | Rearick | 2/12 X |
| 3,164,647 | 1/1965 | Fischler | 264/108 |
| 3,254,932 | 6/1966 | Blaney | 351/47 |
| 3,748,658 | 7/1973 | Albright | 2/10 |
| 3,791,722 | 2/1974 | Ahlberg et al. | 351/45 |
| 4,110,393 | 8/1978 | Trame | 264/246 |
| 4,267,140 | 5/1981 | Meeker | 425/384 |
| 4,276,254 | 6/1981 | Combronde | 264/254 |

FOREIGN PATENT DOCUMENTS

| | | | |
|---|---|---|---|
| 2607231 | 2/1975 | Fed. Rep. of Germany | 264/247 |
| 7109959 | 6/1965 | Japan | 264/247 |

*Primary Examiner*—Jan Silbaugh
*Attorney, Agent, or Firm*—James C. Kesterson

[57] ABSTRACT

A process for the manufacture of an optically transparent device of a selected size and shape and thickness, and having a first distinct portion (44) which is colorless, and a second distinct portion (46) which is of a selected color is disclosed. The process includes providing an injected molding cavity (14) of the selected size, shape and thickness, which cavity may be selectively opened and closed. The cavity is opened (10), and while in the open state, a sheet or film of material (48) is secured (52) to a distinct portion (46) of the cavity (14). The cavity is then closed (54) and a body material is then injected into cavity (14) at a selected temperature and pressure such that the device is formed. The body material has a characteristic such that when injected in the cavity (14) the first portion (44) of the device is formed colorless and transparent, and the second portion (46) of the device is formed and bonded to sheet (48) such that the second portion (46) is transparent and has the selected color. The cavity is then opened (56) and the resulting face shield device removed. In an alternate embodiment, two sheets of material (62, 64) may be added to the cavity (14) prior to the injected molding step.

9 Claims, 6 Drawing Figures

PROCESS FOR MANUFACTURING OPTICALLY CLEAR TWO-COLORED OBJECTS

This application is a continuation of application Ser. No. 526,601, filed Aug. 26, 1983, now abandoned.

TECHNICAL FIELD

This invention relates to processes for the production and fabrication of flexible and optically clear or transparent devices of more than one color. More particularly, this invention relates to a process for the manufacture of optically cleanr face shields typically used with motorcycle helmets wherein one portion of the face shield is colorless and optically transparent for use at night or hazy days, and the other portion is optically clear yet includes color for providing a sun filter for use during bright or sunny days. Typically, the device of this invention, has at least two distinct portions, one of which is of a first color, and one which is clear or of a second color, or may even have three or more distinct colors. The device, regardless of the number of colors incorporated, is manufactured by an injection molding process wherein the various colors incorporated in the face shield form the distinct portions.

BACKGROUND ART

As will be appreciated by those skilled in the art, the need for shields to reduce the glare of the sun on a bright day to ease the effect on a person's eyes has been attempted for eons. It is well known that even primitive Indians and civilizations in the colder and snow covered regions of the world have developed eye shields which comprise simple slits to minimize the amount of light transmitted to the eyes. Likewise, sunglasses are well known as are colored or tinted face masks, shields, and the like.

Further, as is illustrated in U.S. Pat. No. 2,445,153, issued to C. B. Rearick, and U.S. Pat. No. 1,963,716, to I. J. Richey, as well as U.S. Pat. No. 2,138,086, issued to O. Blodjer, the concept of eyeglasses, face shields, or the like which have one transparent section of one color, and another section of a second color is not new in the art. However, a review of these patents, except for the Blodjer patent, disclose rather complex devices for accomplishing this two-colored shield. Also, of course, none of these patents are designed to take the abuse, wear and forces which would be normally experienced by motorcycle riders.

Other patents, such as U.S. Pat. No. 3,748,658, issued to R. W. Albright on July 31, 1973, does show a helmet with a shield having two distinct colors similar to that produced by the process of the present invention. However, upon reading this patent, it is seen that as to the construction of the two-colored shield, there is simply provided information that the shield may be made of a number of plastic materials, and that the light filtering or attenuating may be obtained by tinting, polarization or application of a reflective coating. However, although such techniques may produce a shield which is tinted, for years various agencies have determined that such shields should have minimum physical requirements as to optical clarity, distortion, light transmission capabilities and the like. To this end, to date, there has not been a simple and inexpensive technique for preparing such a two-colored shield during the manufacturing or molding process.

Therefore, it is an object of this invention to provide an inexpensive and simple technique for forming, by injection molding, an optically acceptable transparent face shield which has two distinct portions, one of which at least has a selected color.

Various techniques available for tinting sheets of plastic include the application of a color film on the surface of the face shield, dipping a portion of a shield into a material which will result in tinting and the like. However, as will be appreciated by those skilled in the art, it is most difficult, if not impossible, to laminate a colored film onto a transparent sheet of plastic which will be both flexible and scratch resistant and will possess sufficient optical clarity.

Therefore, it is an object of the present invention to provide a process for the manufacture of an optically transparent device which is both flexible and scratch resistant.

It is another object of this invention to provide a process by which a distinct portion of an optically transparent device may be produced with selected and various colors.

DISCLOSURE OF THE INVENTION

Other objects and advantages will be obvious, and will in part appear hereinafter, and will be accomplished by the present invention which provides a process for manufacturing an optically transparent device of a selected size and shape and which device has a preferable thickness of about 0.060 inches. The device has a first distinct portion which may be colorless or has a first selected color, and a second distinct portion which is of a second selected color. The steps of this process comprise providing an injection molding cavity of the substantially selected size, shape and thickness which cavity is for receiving a selected body material preferralby selected from the group consisting of cellulose Propionate and Butyrate both available from Eastman Kodak, Kingsport, Tenn. This body material is injected into the cavity at a selected temperature and pressure for molding the device. The cavity, of course, may be selectively opened and closed for removing the molded device. In operation, the cavity is opened, then there is secured in the open cavity a transparent sheet of the Propionate or Butyrate material having substantially the selected color and having a thickness of between 0.006 inches and 0.015 inches which is typically less than about thirty percent (30%) of the thickness of the known thickness of the device. The transparent sheet has the size and shape of the second distinct portion and is secured in the cavity at the location of the second distinct portion. The cavity is then closed, and a sufficient quantity of the body material is injected into the cavity at the selected temperature and pressure to fill the molding cavity. The body material has characteristics such that when injected into the cavity at the selected temperature and pressure, the first portion of the optically transparent device is transparent and has a first color which may be clear, and the second portion of the device is formed and bonded to the sheet of material such that this portion is formed transparent with the second selected color. The cavity is then opened and the device removed. It is interesting to note that in this process, the injected material, which in its formed state is normally clear and transparent, may form and bond to either of the surfaces of the sheet of material, or it is believed that in some instances the body material will actually encapsulate and cover both surfaces of the sheet material. In any event, when removed, the sheet of material is securely bonded to the transparent body material of the device which is scratch resistant, pliable, and most inexpensive to manufacture.

BRIEF DESCRIPTION OF THE DRAWINGS

The above-mentioned features of the present invention will be more clearly understood from consideration of the following description in connection with the accompanying drawings in which.

BEST MODE FOR CARRYING OUT THE INVENTION

Figure 1:
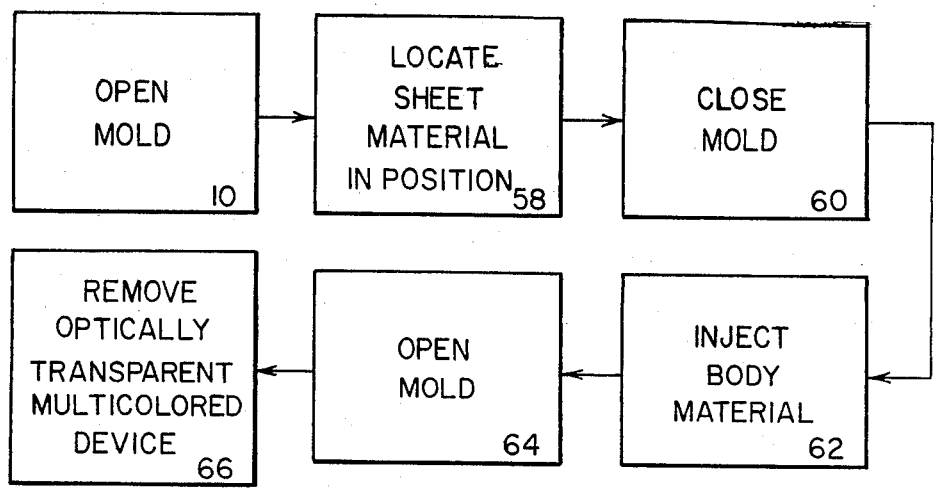
FIG. 1 is a block flow diagram showing the various process steps of the preferred embodiment of the present invention.
Figure 2:
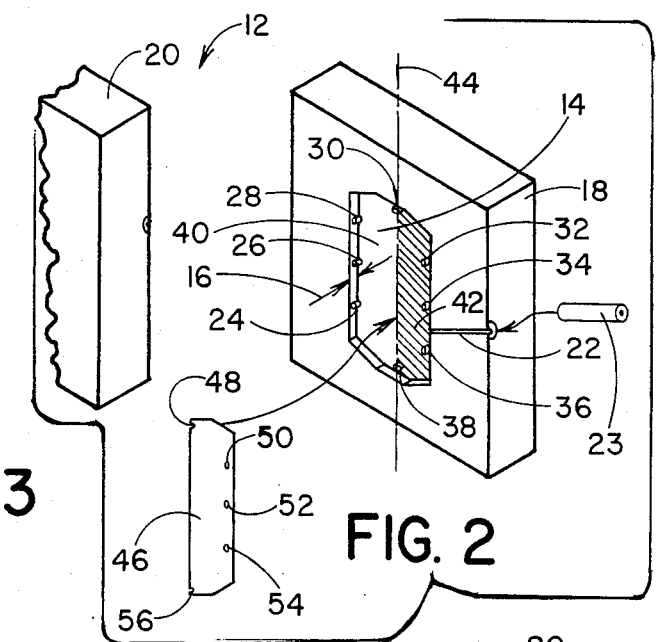
FIG. 2 shows details of the step of securing the sheet of colored material in the injection molding cavity.

Referring now to FIGS. 1 and 2, there are disclosed the processing steps for manufacturing a face shield suitable for use as a motorcycle face shield. As shown in FIG. 1, an injection molding cavity can be opened such, as indicated in block 10 of FIG. 1. Also as shown, injection mold 12, as shown in FIG. 2, includes a thin flat cavity 14 of a selected size and shape has a thickness of between about 0.045 and 0.120 inches as indicated by arrow pair 16. As shown, mold 12 includes a stationary portion 18 in which the thin flat cavity 14 may be completely defined. Also, of course, there is included a moveable portion 20 which may be positioned with respect to stationary portion 18 to completely close cavity 14, except for an injection port 22, through which the molding material may be injected into the cavity by means of injection nozzle 23. It will be appreciated, of course, that the cavity 14 may be completely defined in the stationary portion 18 in some embodiments or it may be partially defined in the stationary portion 18 and the remainder of the cavity defined in moveable portion 20. In any event, moveable portion 20 seals tightly with stationary portion 18 such that the only opening to the cavity is through the injection port 22. Referring again to the cavity 14 defined in stationary portion 18 of FIG. 2, it can be seen that in the embodiment shown, there are included posts 24, 26, 28, 30, 32, 34, 36, and 38 around the perimeter of the cavity. It will be more clearly understood hereinafter that these posts 24 through 28 will cause the apertures in the resulting face shield to be formed. As shown, cavity 14 includes a first portion 40 and a second portion 42, which two portions are indicated by the separation line 44, included in this drawing strictly for instructional purposes. Referring now again to FIG. 1, it is seen that after the cavity 14 is opened a sheet or film of material 46, of cellulose Propionate or Butyrate available from Eastman Kodak of Kingsport, Tenn., and which is substantially the same size as the second portion 42 of cavity 14, is placed in the cavity. Sheet 46 typically will have a thickness of between 0.006 inches and 0.015 inches and preferably will be about 0.009 inches thick.

Figure 4A:
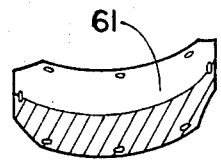
FIGS. 4A and 4B, show examples of the flexible and multi-colored face shields produced by the process of this invention.

The known thickness of the face shield is typically between 0.045 inches and 0.120 inches and preferably about 0.060 inches. Typically, the thickness of the sheet material will be less than about thirty percent (30%) of the known thickness and preferably about ten percent (10%). Sheet 46 is located such that the apertures 48, 50, 52, 54, and 56 are stretched over the posts 30, 32, 34, 36 and 38 such that the sheet 46 is secured in position in the cavity. This step is indicated in FIG. 1 by instructional block 58. The cavity is then closed, as indicated by instructional block 60, such that the cavity with the sheet of film secured therein is ready to receive the body material for injection molding. Body material is then provided through port 22 to the mold 12 into cavity 14 as indicated by instructional block 62 in sufficient quantity to completely fill the cavity and thus form the resulting face shield 61 as indicated in FIG. 4A. It will be appreciated, of course, by those skilled in the art, that any material that is injected molded must be provided into the mold at a particular and selected temperature and pressure. Further, the mold may necessarily be water cooled to maintain a constant temperature. According to the present invention, to assure that the resulting molded shield will be optically transparent, it has been found that sheets of a material selected from the group consisting of Propionate and Butyrate may preferrably be used. It is also believed that if a Propionate sheet of material 48 is used, then the body material should also be Propionate. Similarly, if Butyrate sheet material is used then the body material should also be Butyrate. Also, of course, the temperature and pressure for injecting the material will vary between particular limits depending upon the type of body material used. As an example, Table 1 shows the temperatures and pressures of the injection material and the mold when using Propionate and a molding machine having a 225-ton clamping pressure manufactured by the Lester Company. It will be appreciated by those skilled in the art, that different machines may require different temperatures and pressures from those set out in Table 1.

TABLE 1

| Mold Temperature | Injection Temperature | Injection Pressure |
|---|---|---|
| Stationary mold 120° F. | | |
| Moveable Mold 45° F. | 400° F. to 5%–10% | 1100 psi ± 10% |

Once the material has been injected into the mold, as indicated by instructional block 62, and the device has had time to be formed in the mold, the mold is then opened, as indicated by instructional block 64, and the device such as shown in FIG. 4A is removed as indicated by instructional block 66. A surprising result of this method is that, upon removal, the film of material 46, which was secured on the post in the cavity 14, will not be destroyed, wrinkled or harmed if the temperatures and pressures shown in Table 1 are used. Further, the body material injected into the mold will result in the colorless optical transparent portion 40 and a transparent but colored portion 42. The colored portion 42, is accomplished by the complete bonding of the sheet of material 46 to the resulting transparent molded material. It is this complete bonding and resulting colored yet optically transparent portion 46 which provides unexpected results. The sheet of material bonds cleanly and smoothly to the injected material without optical distortions. It is this surprising result that allows a satisfactory completely transparent, yet two-colored face shield to be produced. It is also, the use of the sheet material which has a distinct shape that allows a distinct portion of the face shield to be a first color, and another portion of another color without bleeding of the two colors.

Of course, for a single color transparent device to be manufactured, it is only necessary to apply coloring or a tint to the body material to be injected prior to such injection. Therefore, using this technique, it will also be appreciated that color could be added to the injected body material and a color sheet of material used such as taught above, such that a two-colored transparent shield is produced. In this technique, one of the colors would be the color of the colored or tinted injected material, whereas the other color would be the combination color of the injected material and the color of the sheet or film secured in the cavity.

Figure 3:
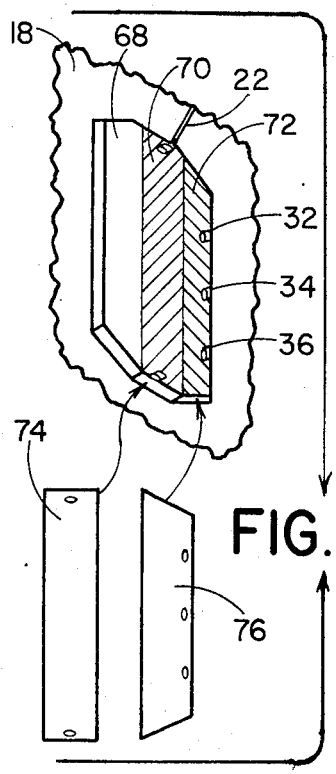
FIG. 3 shows the use of two pieces of sheet material with the process of this invention to produce a face shield having three or more distinct portions of different colors.

Referring to FIG. 3, there is shown how a face shield produced by the technique of this invention may have three distinct portions such as portions 68, 70 and 72. As was the case, and as was discussed heretofore, one of the portions such as portion 68 will have the color (or clearness) of the injected material whereas the remaining two portions such as portions 70 and 72 will have colors achieved by the addition of two different colored sheets of material such as sheets 74 and 76, shown in FIG. 3.

Figure 4B:
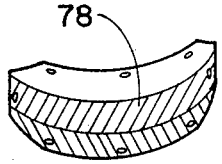

FIG. 4B illustrates the face shield 78 resulting from the process of this invention wherein two different colored sheets or films of material are secured in the cavity prior to the injection of the material.

Figure 5:
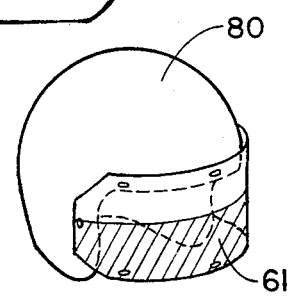
FIG. 5 shows a sample of the shield of FIG. 4A on a typical motorcycle helmet.

FIG. 5 simply shows the face shield 61 of FIG. 4A secured to a typical motorcycle helmet 80 ready for use. As shown, the shield is attached to the helmet as one half of the shield is of one color and the other half of another color. In the embodiment shown, the shield does not move up and down, but the shield may be removed and turned 180 degrees and then reattached to the helmet such that the user may either use the colored portion or the clear portion.

Another technique for providing a face shield such as that shown in FIG. 4A includes simply forming the face shield of the clear and transparent material by the injection molding process and then carefully dipping the shield in a tinting material to achieve the two-colored effect. In this process, materials are most expensive and require considerably increased labor.

Thus, although there has been described up to this point particular embodiments of the process of molding an optically transparent face shield of at least two different colors, it is not intended that such specific references be considered as limitations upon the scope of this invention except insofar as is set forth in the following claims.

I claim:

1. A process for manufacturing a substantially flat optically transparent face shield of a selected size, shape and having a front surface substantially parallel to a back surface, said face shield sufficiently flexible for attaching to protective head gear and having a first distinct portion which is substantially colorless and a second distinct portion which is of a selected color, said process comprising the steps of:

providing a thin flat injection molding cavity of substantially said size, shape and a known thickness of between 0.045 and 0.120 inches between first and second substantially parallel surfaces of said cavity, for receiving a body material selected from the group consisting of Cellulose Propionate and Cellulose Butyrate under a selected temperature and pressure for molding said face shield and wherein said cavity may be selectively opened and closed;

opening said cavity;

securing a transparent sheet of the same material as said body material, and having substantially said selected color, and having a thickness of between 0.006 inches and 0.015 inchdes, and a shape substantially the same as the shape of said second distinct portion of said cavity at a location in said cavity corresponding to said second distinct portion;

closing said cavity;

injecting a quantity of said body material at said selected temperature and pressure into said cavity sufficient to fill said cavity and to form said face shield having said substantially parallel front and back surfaces, said body material having characteristics such that when injected into said cavity at said temperature and pressure, said first portion of said face shield is formed from said body material to be colorless and optically transparent, and said second distinct portion of said face shield is formed to one or both surfaces of said sheet of material such that by clearly, smoothly, and completely bonding said body material said sheet of material is not destroyed, wrinkled, or harmed and said second distinct portion is optically transparent without distortion and with said selected color, such that a user may use said colored second distinct portion as a sun or light filter; and opening said cavity and removing said face shield.

2. The process of claim 1 wherein said face shield has a third distinct portion located between said first and second distinct portions, said third distinct portion of another selected color and further comprising the steps of securing another sheet of material having a thickness of between 0.006 inches and 0.015 inches, within said cavity at a location corresponding to said third distinct portion, said another sheet of material having substantially said another selected color and having a shape substantially the same as the shape of said third distinct portion such that the third distinct portion of said face shield is formed by clearly, smoothly, and completely bonding said body material to one or both surfaces of said another sheet of material so that said third portion of said face shield has said another selected color and such that a user may look through a selected one of said first, second and third distinct portions to vary the amount of light to which his eyes are exposed.

3. The process of claim 1 wherein said transparent sheet defines apertures located around a portion of the perimeter thereof, and further comprising the step of providing posts around the perimeter of said cavity to form apertures around the perimeter of said face shield and for securing said transparent sheet in said cavity by means of said posts.

4. The process of claim 1 wherein said body material and said sheet material is Cellulose Propionate and said injection temperature is between 400° F.+5%-10% and said injection pressure is between 1100 psi±10%.

5. The process of claim 1 wherein said known thickness is about 0.060 inches and said sheet thickness is about 0.009 inches.

6. A process of manufacturing a substantially flat optically transparent face shield of a selected size, shape and having a front surface substantially parallel to a back surface, said face shield sufficiently flexible for attaching to protective head gear and having a first distinct portion of a first selected color and a second distinct portion of a second selected color, said process comprising the steps of:

providing a thin flat injection molding cavity of substantially said size, shape and a known thickness of between 0.045 and 0.120 inches between first and second substantially parallel surfaces of said cavity, for receiving a body material selected from the group consisting of Cellulose Propionate and Cellulose Butyrate under a selected temperature and pressure for molding said face shield, and which cavity may be selectively opened and closed;

opening said cavity;

securing a transparent sheet of the same material as said body material, and having substantially said second selected color, and having a thickness of between 0.006 inches and 0.015 inches, and having a size and shape substantially the same as the shape of said second distinct portion of said cavity at a location in said cavity corresponding to said second distinct portion;

closing said cavity;

injecting a quantity of said body material having said first selected color at said selected temperature and pressure sufficient to fill said cavity and to form said face shield having said substantially parallel front and back surfaces, said body material having characteristics such that when injected into said cavity at said temperature and pressure, said first portion of said face shield is formed from said body material to be optically transparent, with said first selected color and said second distinct portion of said face shield is formed by clearly, smoothly, and completely bonding said body material to one or both surfaces of said first transparent sheet of substantially said second selected color such that said sheet of material is not destroyed, wrinkled, or harmed and said second distinct portion is optically transparent without distortion and has said second selected color, such that a user may selectively look through said first and second distinct portion to vary the amount of light to which his eyes are exposed; and opening said cavity and removing said face shield.

7. The process of claim 6 wherein said face shield has a third distinct portion located between said first and second distinct portions, said third distinct portion of a third color, and comprising the further steps of securing another sheet of material of substantially said third selected color having a thickness of between 0.006 inches and 0.015 inches, and having a size and shape substantially the same as said third distinct portion at a location in said cavity corresponding to said third distinct portion prior to said injection step such that said third distinct portion is formed by clearly, smoothly, and completely bonding said body material to one or both surfaces of said another sheet such that said first selected color of said injection material and said substantially third selected color of said other sheet combines to give said third distinct portion said third selected color.

8. The process of claim 7 wherein said third selected color is the same as said first selected color.

9. The process of claim 6 wherein said first selected color is clear.

* * * * *